(12) United States Patent
Schmitz et al.

(10) Patent No.: US 6,965,402 B2
(45) Date of Patent: Nov. 15, 2005

(54) SYSTEM FOR DETECTING AND STORING DIGITAL PICTURES

(75) Inventors: Thomas Schmitz, Langenhagen (DE); Wolfgang Guse, Hildesheim (DE)

(73) Assignee: Robot Foto und Electronic GmbH, Dusseldorf (DE)

(*) Notice: Subject to any disclaimer, the term of this patent is extended or adjusted under 35 U.S.C. 154(b) by 922 days.

(21) Appl. No.: 09/738,264

(22) Filed: Dec. 15, 2000

(65) Prior Publication Data

US 2002/0135703 A1    Sep. 26, 2002

(30) Foreign Application Priority Data

Dec. 17, 1999 (DE) ............................. 199 60 888

(51) Int. Cl.[7] .................. H04N 5/235; H04N 5/14; H04N 9/64
(52) U.S. Cl. .................. 348/230.1; 348/575; 348/671
(58) Field of Search .................. 348/229.1, 230.1, 348/362, 222.1, 671–672, 678–679, 571–575; 382/168–169

(56) References Cited

U.S. PATENT DOCUMENTS

| | | |
|---|---|---|
| 5,237,431 A | 8/1993 | Imoto |
| 5,317,427 A | 5/1994 | Ichikawa |
| 5,420,635 A * | 5/1995 | Konishi et al. ............. 348/362 |
| 6,130,724 A * | 10/2000 | Hwang ........................ 348/678 |
| 6,137,533 A * | 10/2000 | Azim ....................... 348/222.1 |
| 6,204,881 B1 * | 3/2001 | Ikeda et al. ................. 348/362 |
| 6,526,165 B1 * | 2/2003 | Montillo et al. ............ 382/145 |

FOREIGN PATENT DOCUMENTS

DE          43 31 965 A1        3/1995

OTHER PUBLICATIONS

Image Enhancement, Chapter 4, pp. 139-175, A. Wesley.

* cited by examiner

*Primary Examiner*—Aung Moe
*Assistant Examiner*—Kelly L. Jerabek
(74) *Attorney, Agent, or Firm*—Lawrence G. Fridman

(57) ABSTRACT

Digital pictures are taken by a digital camera. The digital camera provides picture data with a large dynamic range of, for example, 10 bit. Data processing and display devices operate with 8 bit only, i.e. do not take advantage of the high dynamic range of the camera. This is important in traffic monitoring installations, where, on one hand, the driver in a relatively dark passenger compartment of a vehicle and, on the other hand, the bright license plate have to be recognized to provide evidence in court. For this reason, a dark picture and a bright picture are derived from the picture data provided by the camera. This is done by reading, on one hand, the eight least significant digits and, on the other hand, the eight most significant digits of the camera output to provide the dark and bright pictures, respectively. The dark and bright pictures thus obtained are balanced against color, gray, contrast or brightness values of histograms derived from previous pictures. Then the picture data of the dark and bright pictures are mixed to provide a composed picture, in which the dark and bright pictures arc superimposed. This picture permits recognition of both the driver and the license plate.

13 Claims, 2 Drawing Sheets

SYSTEM FOR DETECTING AND STORING DIGITAL PICTURES

BACKGROUND OF THE INVENTION

The invention relates to a device for detecting and storing digital pictures comprising an image detector for the generation of digital picture data and a picture processing device with a picture data memory.

Furthermore the invention relates to a method of detecting, processing and storing digital pictures with a digital camera.

It is known to take pictures with a digital camera, whereby digital picture data are generated, to process these digital picture data and to store the picture data in a data memory. Such digital cameras usually have a CCD image detector. CCD (charge coupled device) image detectors are well known in the literature, and, for example, described in the books "Laserspektroskopie" by Wolfgang Demtröder, $3^{rd}$ Edition, Springer-Verlag Berlin Heidelberg New York or Bergmann Schaefer "Lehrbuch der Experimentalphysik", Festkörper (solid state bodies), Volume 6, de Gruiter Verlag.

Such CCD image detectors consist of a plurality of CCD sensors assembled in a matrix. Each CCD sensor provides color or gray value information for one picture element (pixel). This information is read as digital number. Good CCD sensors have a dynamic range of 10 bit or more. In principle, at least $2^{10}$ color or gray values can be represented with such a system. Current picture display systems usually operate with only 8 bit gray values. Therefore, the 256 gray values which can be displayed with such a system are not sufficient to make full use of the complete dynamic range of the CCD sensors.

Such image detecting and picture processing systems are used in traffic monitoring installations operating with a digital camera. Traffic monitoring installations serve to detect violations of traffic regulations, such as speeding or passing a red traffic light, by a vehicle driver. Such traffic monitoring installations would provide an optimal picture for prosecution of the violation, if both the driver in the comparatively dark passenger compartment of the vehicle and the bright license plate could be well recognized. This is not possible with the presently available image detecting systems. Either the dark portions of the pictures are too dark, if the picture of the license plate is optimally visible, or the bright portions of the pictures are too bright, if the driver is optimally visible in the dark passenger compartment. Thus, when a vehicle is photographed with a digital camera, either the driver in the dark passenger compartment cannot be recognized clearly, or the bright license plate is subject to blanketing and cannot be read, depending on the utilized partial brightness range of the whole dynamic range of the CCD image detector. This results often in considerable problems in particular with the subsequent picture processing. The pictures have to be unambiguously identified both with respect to the driver and to the license plate, in order to serve as evidence in court.

DISCLOSURE OF THE INVENTION

It is an object of the invention to provide a device and a method of picture display with which the information obtained by CCD sensors can be taken advantage of to optimal extent.

To this end, a device for detecting and storing digital pictures is provided, comprising an image detector for the generation of digital picture data and a picture processing device with a picture data memory, wherein means are provided for generating, from an image detected by the image detector, both a relatively dark picture and a relatively bright picture.

A method of detecting, processing and storing digital pictures with a digital camera comprises the step of generating at least two digital pictures having different degrees of brightness.

The invention is based on the discovery that, with conventional digital image detecting systems using CCD sensors as, for example, employed in digital cameras of traffic monitoring installations, the dynamic range of the CCD sensors is not taken advantage of to optimal extent. Therefore, the basic concept is to generate at least one relatively dark picture and one relatively bright picture, these pictures utilizing substantially the whole dynamic range of the CCD sensors. By providing at least two pictures having different brightness components, it becomes possible to better recognize the license plate on one picture, the "dark" picture, and the driver on the other picture, the "bright" picture. This is done by reading out the CCD sensors differently.

The dark picture may, for example, be generated by reading out the eight least significant bits of the CCD sensors. These eight least significant bits contain more useful information about the bright components of the picture. The dark picture permits more easy identification of the license plate appearing very bright as compared to the passenger compartment. In the dark picture, however, the driver appears, at best, as a dark shadow only. Therefore, the bright picture is generated using the eight most significant bits of the CCD sensors. These eight more significant bits contain more useful information about the dark components of the picture. Thereby, the bright picture permits recognition of the driver without problems. In this bright picture, the white license plate is seen as a bright area only, which does not permit recognition of the license number. With the two pictures, the dynamic range of a 10 bit CCD sensor is taken advantage of to full extent.

Advantageously, the two digital pictures are combined. To this end, means for mixing the picture containing with the bright components and the picture with the dark components. A single picture is generated, which may look a little artificial, in which, however, both the license plate and the driver can easily be recognized.

Furthermore, picture balancing means may be provided for balancing the images to be detected in accordance with a priori available information, for example when exposures are made at daytime or at night. To this end, a histogram is used giving the statistical distribution of, for example, the gray values of the various picture elements or pixels in a picture. At first, such histogram is generated from a test "dark" picture, in which the license number can be read clearly from the license plate. In such a histogram, a certain high percentage of the gray values is below a certain level. This level serves as a reference. This is a priori information. Then a first picture of a vehicle is taken, with the digital camera in actual use. A histogram is generated from this first picture. The balancing means check, which percentage of the pixel gray values is below the reference level. If the percentage is higher than in the test picture, the picture may be too dark. The diaphragm of the camera is then opened or the exposure time is increased by one step for the next exposure. If the percentage of gray values below the reference level is lower than in the test picture, which means that more gray values are above the reference level, the "dark" picture may be too bright due to daylight illumination of the photographed scene. Therefore, the diaphragm of the camera is closed or the exposure time is reduced by one step for the next exposure. Thus each picture is used to improve the quality of the next picture and to approximate the quality of the test picture. Thus the digital camera adapts itself to the gradual variations of, for example, the daylight illumination.

PREFERRED EMBODIMENT OF THE INVENTION

Figure 1:
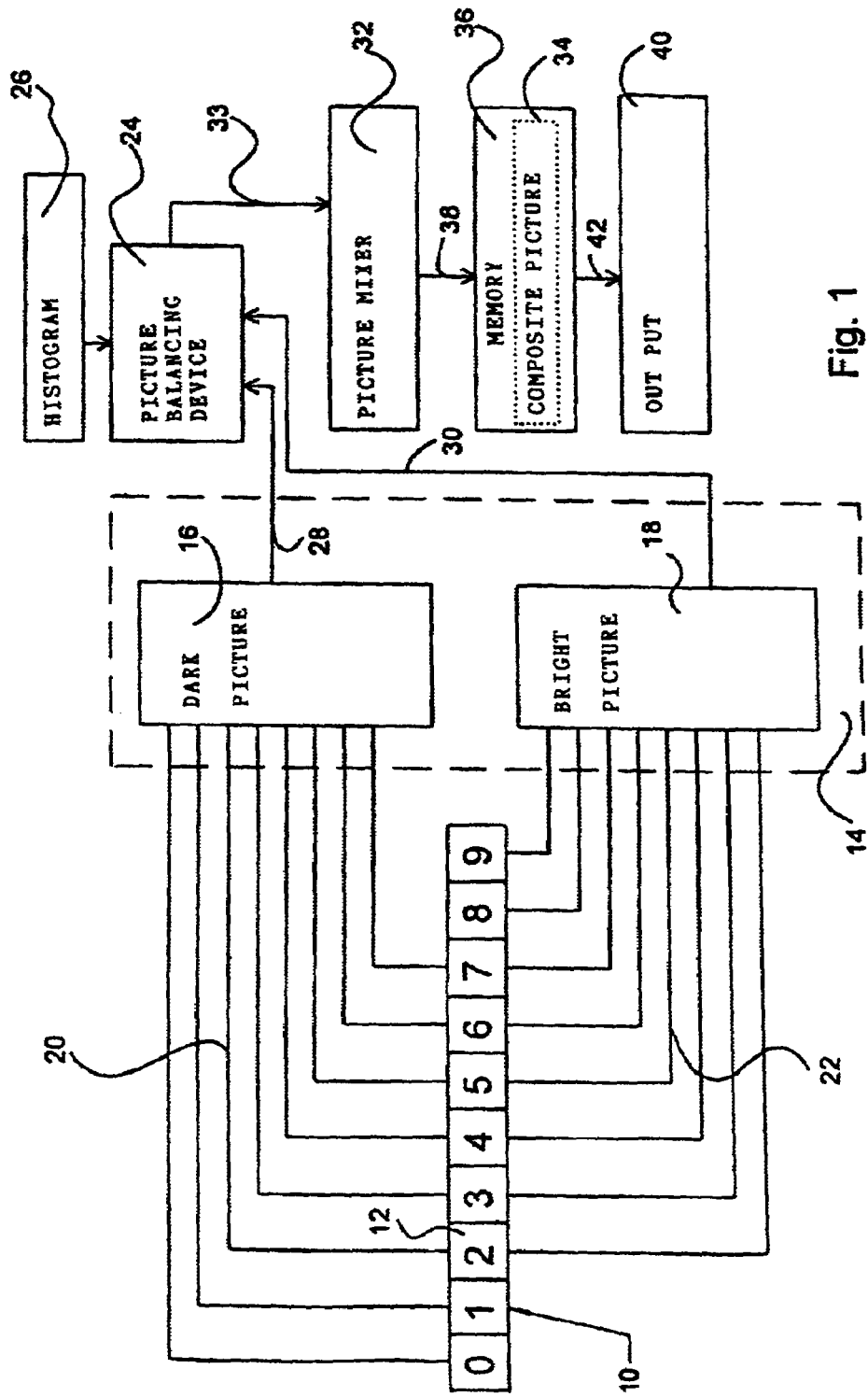
FIG. 1 is a schematic illustration in the form of a block diagram of an image detecting system

FIG. 1 is a schematic illustration in the form of a block diagram of an image detecting system for detecting and evaluating an image by means of a digital camera. Preferably, such image detecting system is used in a traffic monitoring installation for watching traffic. Referring to FIG. 1, numeral 10 designates a CCD detector. The CCD detector is a picture detector as used in digital cameras. In the present case, the CCD detector 10 has a dynamic range of 10 bit. This is illustrated by ten fields 12. Of course, also CCD sensors having a larger dynamic range can be used, and the invention is not limited to this embodiment.

The least significant bit of the CCD sensor, the field 12 labeled "0", represents the darkest picture component. The most significant bit, the field 12 labeled "9", represents the brightest picture component The intermediate bits of the CCD sensor represent increasingly bright picture components.

The picture data read out of the CCD sensor 10 are filed once as a so-called "dark" picture 16 and once as a "bright" picture in a picture data memory 14 shown in dashed lines. The dark picture is generated by reading out the eight least significant bits of the CCD sensor 10. Accordingly, the bright components of the picture are represented in this dark picture with high precision and are not subject to blanketing. The bright picture 18 is generated by reading out the eight most significant digits of the CCD sensor 10. In this bright picture, the dark components of the picture can be recognized best, as, because of the "overexposure", they are optimally illuminated. Lines 20 represent the reading out of the eight least significant bits. Lines 22 represent the reading out of the eight most significant bits.

The operational sequence of the digital picture processing is controlled by a programmed processor. The connecting lines of the individual blocks in FIG. 1 are appropriate electrical connections or electrical circuits or program components for realizing the described events.

Both the dark picture 16 and the bright picture 18 are balanced by means of a picture balancing device 24 with a respective histogram 26 for optimization. The histogram contains, as data, information which result from pictures taken previously and optimized correspondingly. This information is introduced into the newly taken digital pictures to be processed. Such information may be, for example, data relating to the light, color or gray situations, or contrasts etc.

The picture balancing serves to selectively optimize only those data of the pictures which are relevant for the subsequent evaluation. In a traffic monitoring installation, these picture data are the data representing the license plate and the passenger compartment. The remaining picture data are of minor importance.

Supplying the picture data of the dark and bright pictures 16 and 18 to the picture balancing device, is illustrated by arrows 28 and 30, respectively. From the picture balancing device 24, the picture data from the dark and bright pictures are, in turn, supplied to a picture mixer 32, as illustrated by arrow 33. The picture mixer composes a single picture 34 from the optimized dark picture 18 and the optimized bright picture 18. This composed picture is stored in a memory 36, as indicated by arrow 38. The composed picture 34 is illustrated as a block in dotted lines in the memory 36.

Mixing of the pictures 16 and 18 is effected by placing the relevant picture components of the dark picture 16, for example the bright license plate and the headlights, at the same position into the bright picture. Thereby, both the passenger compartment with the driver and the license plate can be recognized precisely on one single picture.

The composed bright/dark picture 34 can be outputted from the memory 36 for further processing or for display on a screen. This is illustrated by block 40 representing an output device. Arrow 42 represents the data transfer to the output device.

Figure 2:
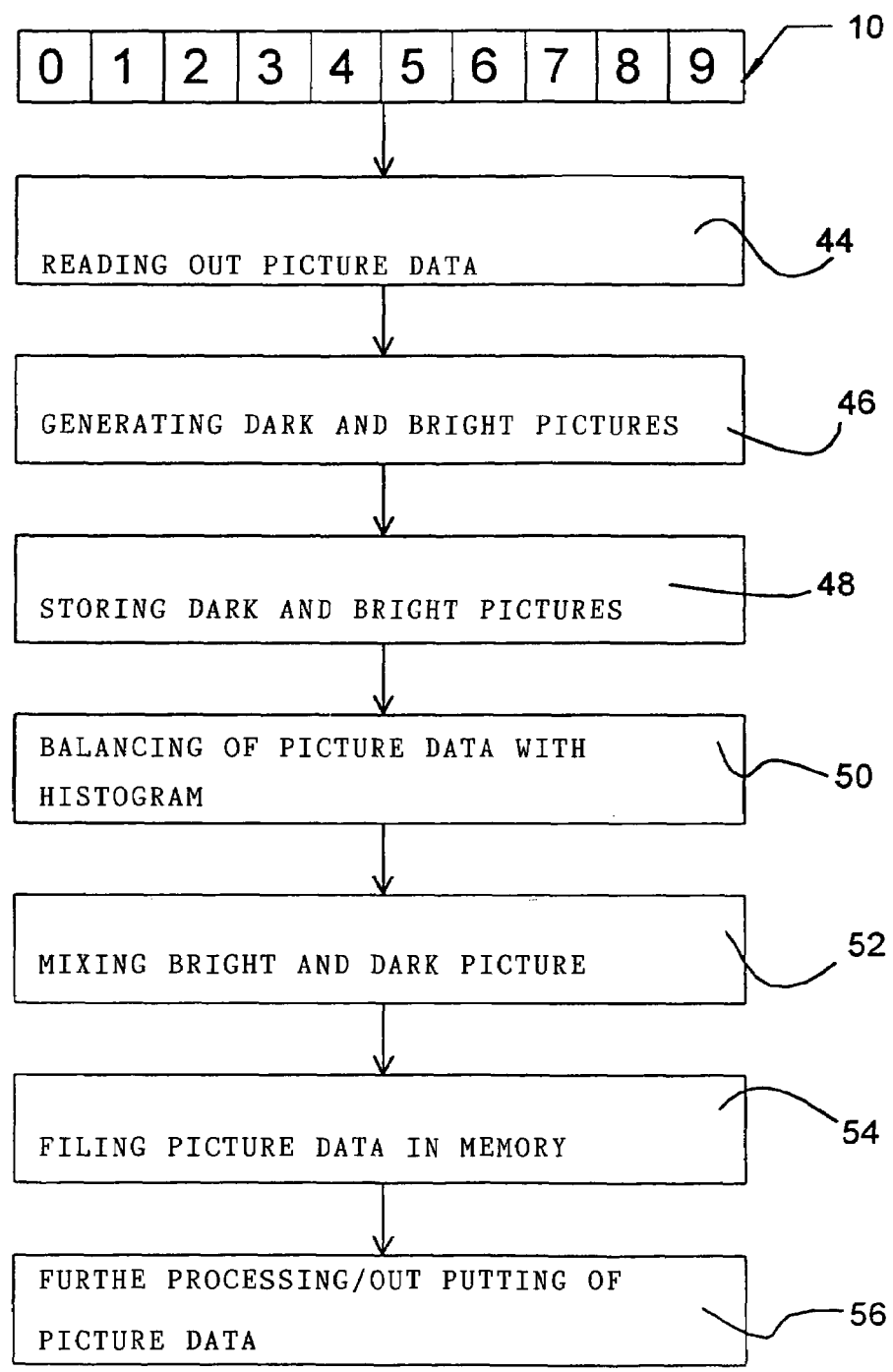
FIG. 2 is a schematic illustration of a method of detecting, processing and storing digital pictures with a digital camera.

Referring now to FIG. 2, the corresponding method steps are illustrated in the form of a block diagram. The block diagram shows, how the method basically proceeds in accordance with the invention. The picture data are read out from the CCD sensor 10. The reading-out process is illustrated by block 44. By the reading out, a dark picture and a bright picture are generated. This is symbolized by block 46. Subsequently, both the dark and the bright picture are stored in a memory. This is shown by block 48. The balancing of the pictures thus generated with a histogram is shown by block 50. The mixing of the bright picture and the dark picture is shown by block 52. This composed picture, eventually, is filed in a memory. This is shown by block 54 of the diagram. From there, the picture data can be retrieved by a further device for further processing such as compression or evaluation by means of character recognition or may be outputted by an output device such as a screen or a printer. The further processing of the picture data or their outputting is represented by block 56.

We claim:

1. A device for obtaining of pictures by means of a digital camera over an extended range of brightness values comprising:
    (a) image detector means for resolving an image into pixels and for generating for each pixel first digital picture data indicative of the brightness of said image at said pixel, said image detector means having a dynamic range extending over a first number of digits;
    (b) a picture data memory;
    (c) signal processing means including means for reading from said image detector means a second number of relatively low significance digits as second digital picture data and a third number of relatively high significance digits as third digital picture data, said second and third numbers being smaller than said first number; and
    (d) means for storing said second digital picture data as a "dark" picture and said third digital picture data as a "bright" picture in said picture data memory.

2. A device as claimed in claim 1, wherein said signal processing means further comprise picture balancing means for optimizing the pictures generated by said second and third picture data.

3. A device as claimed in claim 2, wherein said picture balancing means comprise means for providing digital histogram of data from a previously taken picture and means for balancing said picture data relative to said histogram.

4. A device as claimed in claim 3, wherein said histogram contains color value data.

5. A device as claimed in claim 3, wherein said histogram contains gray value data.

6. A device as claimed in claim 3, wherein said histogram contains brightness value data.

7. A device as claimed in claim 1, further comprising mixing means for superimposing said pictures generated by said second and third picture data.

8. A method for taking pictures by means of a digital camera over an extended range of brightness values comprising the steps of:
- resolving an image into pixels, each pixel being represented by first picture data indicative of brightness of the pixel and having a first number of digits;
- reading from said first picture data a second number of digits having a relatively low significance as second picture data;
- storing said second picture data as a "dark" picture;
- reading from said first picture data a third number of digits having a relatively high significance as third picture data; and
- storing said third picture data as a "bright" picture.

9. A method as claimed in claim 8, further comprising a step of balancing gray values of said picture data of said "dark" and "bright" pictures with a gray value histogram of a previously taken picture.

10. A method as claimed in claim 8, further comprising a step of balancing color values of said picture data of said "dark" and "bright" pictures with a color value histogram of a previously taken picture.

11. A method as claimed in claim 8, further comprising a step of balancing brightness values of said picture data of said "dark" and "bright" pictures with a brightness value histogram of a previously taken picture.

12. A method as claimed in claim 8, further comprising a step of balancing contrast values of said picture data of said "dark" and "bright" pictures with a contrast value histogram of a previously taken picture.

13. A method as claimed in claim 8, wherein digital picture data of said two digital "dark" and "bright" pictures are mixed to provide a superimposed digital picture.

\* \* \* \* \*